(12) United States Patent
Xue et al.

(10) Patent No.: US 8,301,077 B2
(45) Date of Patent: Oct. 30, 2012

(54) ANTENNA NETWORK FOR PASSIVE AND ACTIVE SIGNAL ENHANCEMENT

(75) Inventors: Quan Xue, Hong Kong (HK); Shu Yuen Ron Hui, Shatin (HK); Kwun Chiu Wan, Kowloon (HK)

(73) Assignee: ConvenientPower, Ltd, Shatin, Hong Kong (CN)

( * ) Notice: Subject to any disclaimer, the term of this patent is extended or adjusted under 35 U.S.C. 154(b) by 443 days.

(21) Appl. No.: 12/566,438

(22) Filed: Sep. 24, 2009

(65) Prior Publication Data
US 2011/0070830 A1 Mar. 24, 2011

(51) Int. Cl.
*H04B 3/36* (2006.01)
(52) U.S. Cl. ..... 455/7; 455/63.1; 455/67.13; 455/114.2; 455/573; 370/315; 375/211
(58) Field of Classification Search .................. 455/573, 455/41.1, 73, 82, 83, 86, 7–10, 14–25, 63.1, 455/67.13, 114.2; 370/315; 375/211
See application file for complete search history.

(56) References Cited

U.S. PATENT DOCUMENTS

| | | | | |
|---|---|---|---|---|
| 4,696,055 A | * | 9/1987 | Marshall | 455/118 |
| 5,487,179 A | * | 1/1996 | Larsson | 455/69 |
| 5,668,561 A | | 9/1997 | Perrotta et al. | |
| 6,127,799 A | * | 10/2000 | Krishnan | 320/104 |
| 6,191,670 B1 | * | 2/2001 | Nguyen | 333/208 |
| 6,542,724 B1 | * | 4/2003 | Copeland et al. | 455/302 |
| 6,577,850 B2 | * | 6/2003 | Norimatsu | 455/126 |
| 6,937,200 B2 | * | 8/2005 | Takei | 343/767 |
| 7,088,964 B2 | * | 8/2006 | O | 455/90.3 |
| 7,239,145 B2 | * | 7/2007 | Homan et al. | 324/356 |
| 7,576,514 B2 | * | 8/2009 | Hui | 320/108 |
| 2007/0222426 A1 | * | 9/2007 | Waffenschmidt et al. | 323/355 |
| 2008/0165066 A1 | * | 7/2008 | Tiscareno et al. | 343/702 |
| 2009/0111393 A1 | * | 4/2009 | Scalisi et al. | 455/90.1 |
| 2009/0236140 A1 | * | 9/2009 | Randall | 174/268 |
| 2009/0278494 A1 | * | 11/2009 | Randall | 320/114 |
| 2010/0174629 A1 | * | 7/2010 | Taylor et al. | 705/34 |
| 2010/0202627 A1 | * | 8/2010 | Gray | 381/77 |
| 2010/0253442 A1 | * | 10/2010 | Mu | 333/17.1 |
| 2011/0187318 A1 | | 8/2011 | Hui et al. | |
| 2011/0199045 A1 | | 8/2011 | Hui et al. | |

FOREIGN PATENT DOCUMENTS

WO    WO 2009033043 A2 * 3/2009

OTHER PUBLICATIONS

Hui, S. Y, et al., "A comparison of nondeterministic and deterministic switching methods for DC-DC power converters", *IEEE Transactions on Power Electronics*, 13(6), (Nov. 1998), 1046-1055.

* cited by examiner

*Primary Examiner* — Raymond Dean
(74) *Attorney, Agent, or Firm* — Fenwick & West LLP

(57) ABSTRACT

The Present Invention Provides an Antenna Network for Passively or Actively enhancing signal transmission or reception of one or more portable transceiver devices. The antenna network includes one or more antennas, each having a coupling portion and a radiating portion, the coupling portion being distributed across a coupling area and the radiating portion being located away from the coupling area, whereby signal transmission or reception of the one or more portable transceiver devices can occur through the radiating portion when the one or more portable transceiver devices are located within the coupling area.

39 Claims, 11 Drawing Sheets

ANTENNA NETWORK FOR PASSIVE AND ACTIVE SIGNAL ENHANCEMENT

FIELD OF THE INVENTION

The present invention relates to antenna networks for passive or active enhancement of signal transmission or reception. The invention has been described in relation to the enhancement of signal transmission and reception of portable transceiver devices in the context of use with wireless power transfer devices, but it will be appreciated that the invention is not limited to this particular application.

BACKGROUND OF THE INVENTION

There is a wide variety of portable transceiver devices, that is, devices capable of signal transmission or reception, for use in many applications. For example, mobile phones and most netbook computers have inbuilt antennas for transmitting and receiving signals for wireless communication. However, there are situations in which the signal transmission or reception of these devices is compromised.

One situation is when portable transceiver devices are being charged by wireless power transfer devices. Recent developments have highlighted the growing importance of wireless charging technology, and in the future, it is anticipated that more consumer electronic products with an inbuilt antenna and a wireless energy-receiving module will be developed. For example, wireless battery charging pads have been proposed for a wide range of portable electronic transceiver devices, such as mobile phones and netbook computers. One such wireless charging pad is shown schematically in FIG. 1.

As shown in FIG. 2, these wireless charging pads usually require an electromagnetic (EM) shield underneath the charging surface to prevent the AC magnetic flux generated by the primary (transmitter) windings from penetrating into the bottom area of the wireless charging pad. This is to avoid the AC magnetic flux from inducing current and thus causing heat dissipation in any metallic surface on which the wireless charging pad may be placed. The presence of the EM shield, however, has a side effect. Since the antennas of the electronic devices will be placed on top of this EM shield, the EM shield will reduce the signal transmission or reception of the electronic devices if they are placed on the charging surface, with the EM shield underneath.

One prior device for enhancing signal transmission or reception is described in U.S. Pat. No. 5,668,561. In particular, an antenna coupler is proposed for an adapter for a portable radio. It is stated in U.S. Pat. No. 5,668,561 that the antenna in such a radio is typically placed in the bottom near the outlet connector so that it is far away from the head of the user. Since the antenna is close to the connector, the signal transmission or reception ability of the antenna may be reduced. Thus, U.S. Pat. No. 5,668,561 proposes an antenna coupler. More particularly, through a pair of capacitive coupling plates, the external antenna is coupled to the antenna inside the portable radio. The proposed antenna in U.S. Pat. No. 5,668,561 is a three-dimensional one and is used in an adaptor into which the outlet connector of the mobile phone is inserted.

However, the application described in U.S. Pat. No. 5,668,561 is for fixed-position charging, in which the electronic device is located in a fixed position. In addition, the external antenna is a traditional wired antenna. The situation and problems addressed by the present invention are of a completely different nature. Firstly, the presence of the EM shield shown in FIG. 1 substantially reduces the strength of the signals transmitted and received in the electronic devices through the EM shield. Secondly, the devices can be placed in any position of the charging area, that is, there is a free-positioning feature in the wireless charging situation addressed by the present invention. Accordingly, the device described by U.S. Pat. No. 5,668,561 is not suitable for the situation and problems addressed by the present invention.

It is therefore an object of the present invention to overcome or ameliorate at least one of the disadvantages of the prior art, or to provide a useful alternative.

SUMMARY OF THE INVENTION

The present invention provides an antenna network for enhancing signal transmission or reception of one or more portable transceiver devices, the antenna network including one or more antennas, each having a coupling portion and a radiating portion, the coupling portion being distributed across a coupling area and the radiating portion being located away from the coupling area, whereby signal transmission or reception of the one or more portable transceiver devices can occur through the radiating portion when the one or more portable transceiver devices are located within the coupling area.

Preferably, the coupling area is adjacent a signal shield. Also preferably, the radiating portion of at least one of the antennas is located such that signal transmission or reception of the one or more portable transceiver devices through the radiating portion can substantially circumvent the signal shield. In one embodiment, the radiating portion of at least one of the antennas is located beyond a perimeter of the signal shield. In another embodiment, the coupling area is on a first side of the signal shield and the radiating portion of at least one of the antennas is located on a second side of the signal shield opposite the first side. In a further embodiment, the radiating portion of at least one of the antennas is located beyond a perimeter of the signal shield, and the radiating portion of at least another of the antennas is located on a second side of the signal shield.

Preferably, the one or more antennas form a repeater matrix across the coupling area. Preferably, at least one of the antennas is thin. Preferably, at least one of the antennas is planar. It is also preferred that at least one of the antennas is made of metal.

Preferably, the coupling portion of at least one of the antennas is a coupling track. Preferably, the radiating portion of at least one of the antennas is a radiating patch. In another embodiment, the coupling portion and the radiating portion of at least one of the antennas are combined in the form of an elongate strip.

Preferably, the antenna network has a plurality of the antennas spaced apart such that interference between the antennas is minimised.

Preferably, the coupling portion or portions of the one or more antennas form an array of spaced substantially parallel linear strips across the coupling area.

In one embodiment, the antenna network has one of the antennas, wherein the coupling portion has branches forming the array of spaced substantially parallel linear strips across the coupling area.

In another embodiment, the antenna network has a plurality of the antennas, wherein the coupling portion of each antenna forms at least one of the linear strips in the array of spaced substantially parallel linear strips.

In one embodiment, the radiating portion of each antenna is located along one side of the coupling area. In another embodiment, the radiating portions of the antennas are alternately located on two opposite sides of the coupling area.

In a further embodiment, the array of linear strips is aligned in a first direction, and one or more of the coupling portions of the one or more antennas form another array of spaced substantially parallel linear strips aligned in a second direction across the coupling area, thereby forming a matrix of linear strips across the coupling area. Preferably, the arrays of linear strips are electrically isolated to minimise the formation of current loops. Also preferably, the first and second directions are substantially orthogonal to each other, thereby forming a grid of linear strips across the coupling area.

Preferably, at least one of the antennas includes an amplifying repeater connected between the coupling portion and the radiating portion for amplifying signal transmission or reception. Preferably, the amplifying repeater includes a power amplifier or a low noise amplifier. Also preferably, the amplifying repeater includes a mixer and a signal generator to change the frequency channel of signal transmission or reception, thereby to minimise any feedback. Preferably, the mixer includes a filter. Preferably, the signal generator includes a filter. Also preferably, the antenna includes a filter connected between the coupling portion and the amplifying repeater. It is also preferred that the antenna includes a filter connected between the radiating portion and the amplifying repeater.

In one embodiment, at least two of the antennas each include a respective amplifying repeater, one of the antennas being for signal transmission and the other of the antennas being for signal reception.

In another embodiment, the at least one of the antennas includes:
two of the amplifying repeaters, one of the amplifying repeaters being for signal transmission and the other of the amplifying repeaters being for signal reception;
a first duplexer connecting the coupling portion to the two amplifying repeaters; and
a second duplexer connecting the radiating portion to the two amplifying repeaters;
the antenna thereby being for both signal transmission or reception.

Preferably, each duplexer is formed from two filters.

Preferably, the antenna network includes a power supply for powering the amplifying repeater. More preferably, the power supply includes one or both of a battery and a solar panel.

Preferably, the signal shield is part of a wireless power transfer device having a charging surface, the charging surface being in the coupling area. In one embodiment, the one or more coupling portions are embedded in the charging surface. In another embodiment, the wireless power transfer device includes a power transfer winding structure, and the one or more coupling portions are integrated into the power transfer winding structure. In a further embodiment, the one or more coupling portions are provided in an accessory device adapted for use with the wireless power transfer device such that the coupling portions can be placed adjacent the charging surface.

Preferably, at least one of the antennas is adapted for signal transmission or reception in at least a bandwidth of 800 MHz to 3 GHz.

Preferably, the antenna network is in the form of a flexible or a rigid printed-circuit board, or a combination of both.

BRIEF DESCRIPTION OF THE FIGURES

Preferred embodiments in accordance with the best mode of the present invention will now be described, by way of example only, with reference to the accompanying figures, in which.

DETAILED DESCRIPTION OF THE BEST MODE OF THE INVENTION

Figure 1:
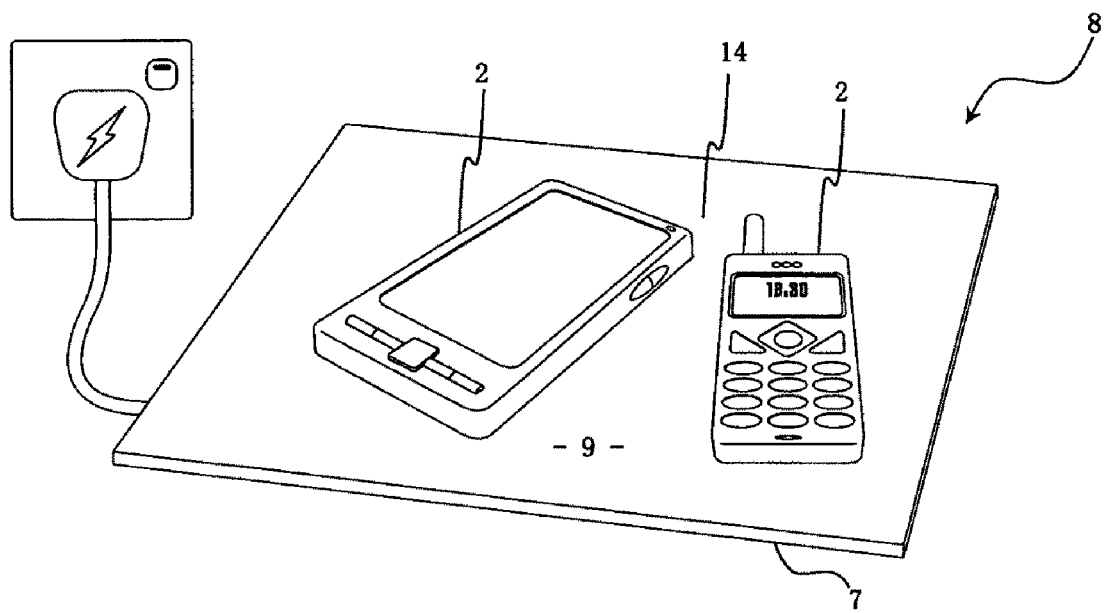
FIG. 1 is a schematic diagram of a wireless battery charging pad known in the prior art, shown with portable transceiver devices placed on the charging surface.
Figure 2:
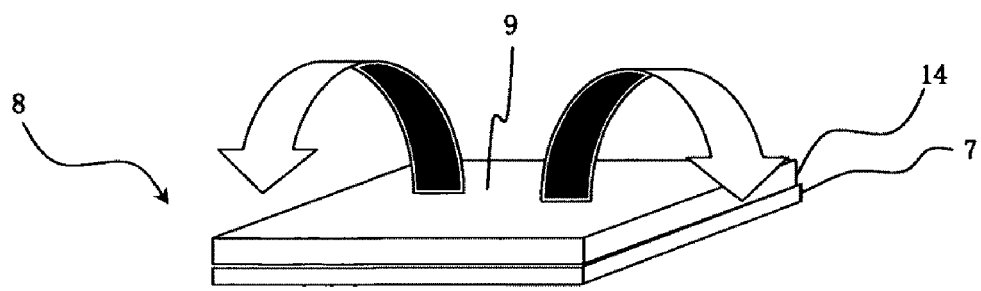
FIG. 2 is a schematic diagram of the wireless battery charging pad of FIG. 1, showing an EM signal shield on the bottom of the wireless charging pad.

Referring to the figures, an antenna network 1 for enhancing signal transmission or reception of one or more portable transceiver devices 2 is provided. The antenna network 1 includes one or more antennas 3, each having a coupling portion 4 and a radiating portion 5. The coupling portion 4 is distributed across a coupling area 6 and the radiating portion 5 is located away from the coupling area 6, whereby signal transmission or reception of the one or more portable transceiver devices 2 can occur through the radiating portion 5 when the one or more portable transceiver devices are located within the coupling area 6.

Thus, signal transmission or reception of the portable transceiver devices 2 is enhanced. In general, this is achieved by allowing signal transmission or reception in many directions by using the radiating portion or portions 5, especially those directions in which signal transmission or reception of the portable transceiver devices 2 would otherwise be weak if the present invention were not used. However, as shown in the embodiments depicted in the drawings, the invention is particularly suited to applications where the coupling area 6 is adjacent a signal shield 7. More particularly, in the present embodiments, the signal shield 7 is part of a wireless power transfer device 8 having a charging surface 9, the charging surface being in the coupling area 6.

The radiating portion 5 of at least one of the antennas 3 is located such that signal transmission or reception of the one or more portable transceiver devices 2 through the radiating portion can substantially circumvent the signal shield 7. In some embodiments, the radiating portion 5 of at least one of the antennas 3 is located beyond a perimeter 10 of the signal shield 7. In other embodiments, such as those shown in FIGS. 12 and 14, the coupling area 6 is on a first side 11 of the signal shield 7 and the radiating portion 5 of at least one of the antennas 3 is located on a second side 12 of the signal shield opposite the first side. There are also embodiments having a plurality of the antennas 3, in which the radiating portion 5 of at least one of the antennas 3 is located beyond the perimeter 10 of the signal shield 7, and the radiating portion 5 of at least another of the antennas 3 is located on the second side 12 of the signal shield 7.

Figure 10:
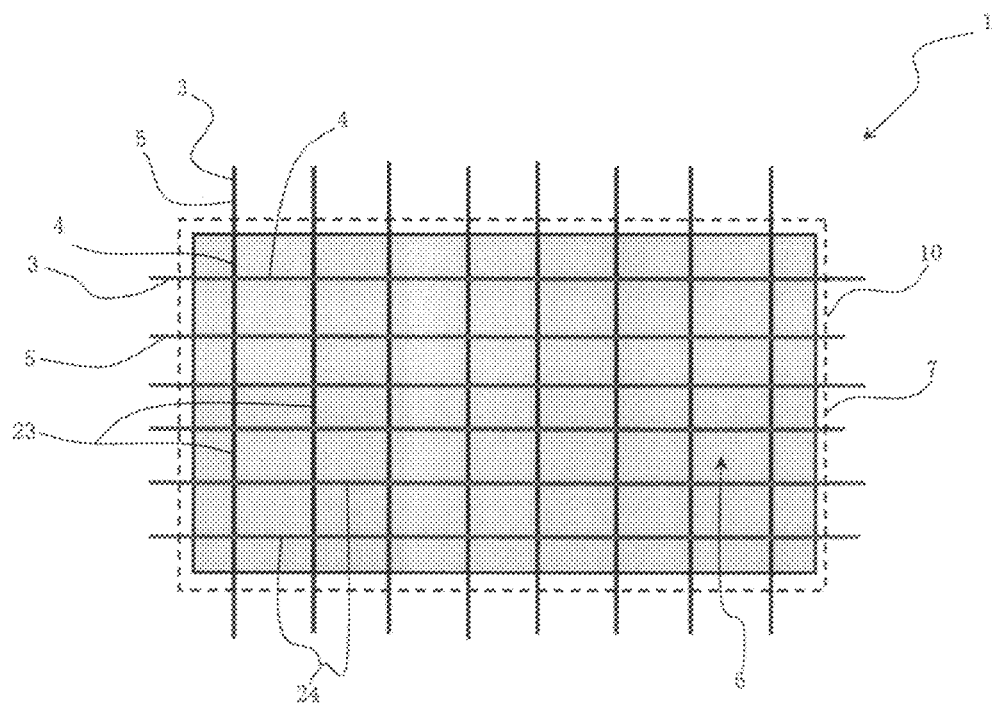
FIG. 10 is a schematic diagram of an antenna network in accordance with another embodiment of the present invention, in which the coupling portion or portions form a grid embedded in a charging surface.
Figure 11:
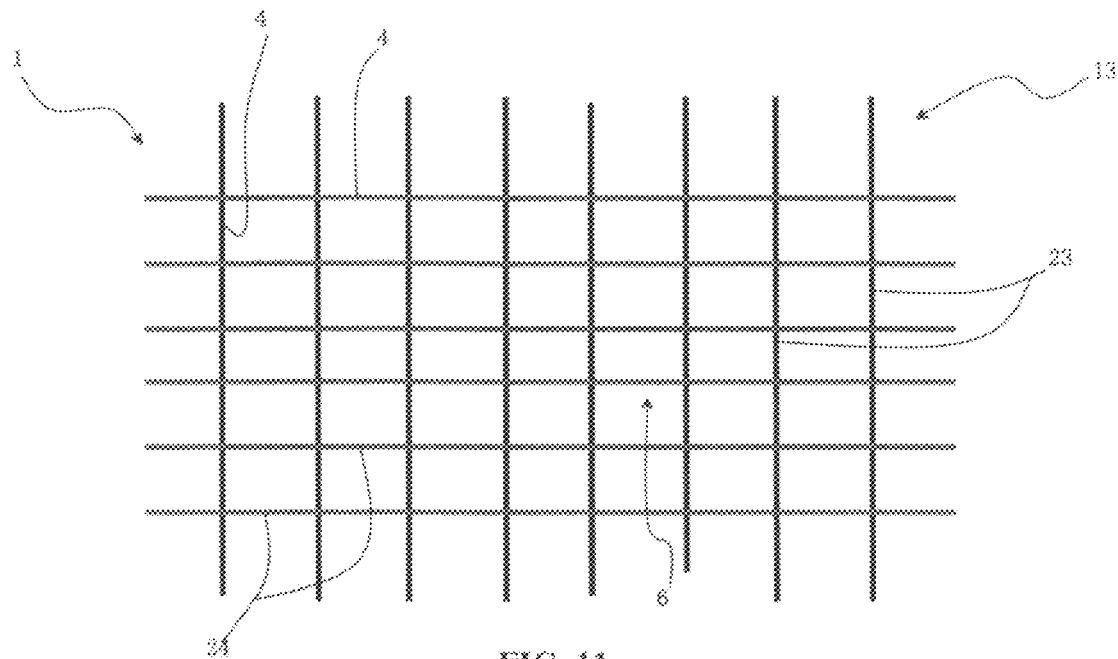
FIG. 11 is a schematic diagram of an antenna network in accordance with further embodiment of the present invention, in which the coupling portion or portions form a grid in an accessory device.

In some embodiments, as schematically shown in FIG. 10, the one or more coupling portions 4 are embedded in the charging surface 9. Where the wireless power transfer device 8 includes a power transfer winding structure, the one or more coupling portions 4 can be integrated into the power transfer winding structure. In other embodiments, as shown schematically in FIG. 11, the one or more coupling portions 4 are provided in an accessory device 13 adapted for use with the wireless power transfer device 8 such that the coupling portions 4 can be placed adjacent the charging surface 9.

As shown in the various embodiments depicted in the drawings, the one or more antennas 3 form a repeater matrix across the coupling area 6. Preferably, at least one of the antennas 3 is thin, and more preferably, all of the antennas are thin. This is so that the induced current and the subsequent induction heating due to the main AC magnetic flux provided by the wireless power transfer device 8 for charging the portable transceiver devices 2 can be minimised. Also preferably, at least one of the antennas 3 is planar. In the present embodiments, the charging surface 9 is formed by a planar charging pad 14. Thus, it will be appreciated that having one or more of the antennas 3 planar makes the antennas particularly suited to being embedded in or placed on the charging surface 9. It is also preferred that the antennas 3, or at least one of the antennas, are made of metal. However, any material suitable for signal transfer can be used.

In the simplest embodiments, the coupling portion 4 and the radiating portion 5 of each antenna 3 are combined in the form of an elongate strip. In other embodiments, the coupling portion 4 is a coupling track and the radiating portion 5 is a radiating patch. It will be appreciated that only one, some or all of the antennas can take any one of these forms. Also, embodiments of the antenna network can have antennas in a combination of these forms. Thus, in various embodiments, one or more antennas 3 can be in the form of an elongate strip, one or more of the coupling portions 4 can be a coupling track, and one or more of the radiating portions 5 can be a radiating patch. Preferably, where there is a plurality of antennas 3, the antennas are spaced apart such that interference between the antennas is minimised.

In some embodiments, at least one of the antennas 3 includes an amplifying repeater 15 connected between the coupling portion 4 and the radiating portion 5 for amplifying signal transmission or reception. In the embodiments shown in FIGS. 4, 5, 8, 9, 13 and 14, all of the antennas 3 in the antenna network 1 include an amplifying repeater 15. In other embodiments, some antennas 3 include an amplifying repeater 15 and others do not. The antenna network 1 can include a power supply for powering the one or more amplifying repeaters 15. The power supply can include, for example, one or both of a battery and a solar panel. Thus, both active signal enhancement, through an antenna 3 with a powered amplifying repeater 15, and passive signal enhancement, without any powered amplification, are possible with the present invention.

Figure 18:
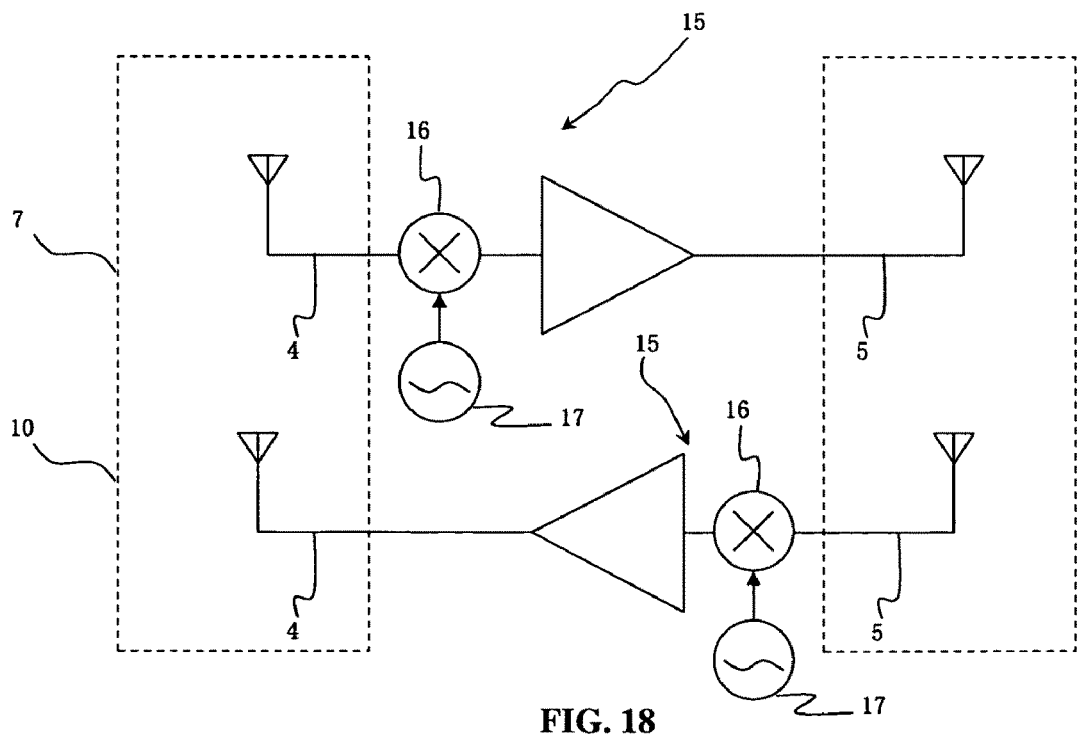
FIG. 18 is a schematic diagram of two antennas in accordance with another embodiment of the present invention, in which each antenna includes an amplifying repeater having a mixer and a signal generator.

The amplifying repeater 15, in some embodiments, includes a power amplifier, whilst in other embodiments, the amplifying repeater 15 includes a low noise amplifier. However, any other suitable type of amplifier or any combination of suitable amplifiers can be used. In the embodiments shown in FIGS. 18, 19 and 21, the amplifying repeater 15 includes a mixer 16 and a signal generator 17 to change the frequency channel of signal transmission or reception, thereby to minimise any feedback. The mixer 16 and the signal generator 17 can each include a filter 18.

Figure 19:
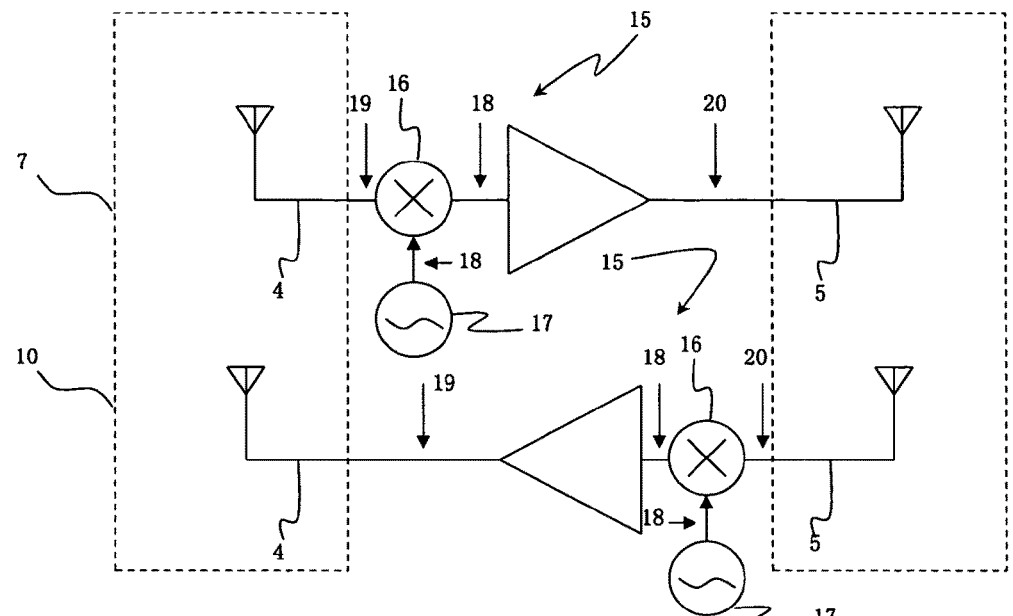
FIG. 19 is a schematic diagram of two antennas in accordance with the embodiment shown in FIG. 18 showing possible locations of filters.

The antenna 3 can also include another filter 19 connected between the coupling portion 4 and the amplifying repeater 15. A further filter 20 can be connected between the radiating portion 5 and the amplifying repeater 15. FIG. 19 shows the various locations where filters 18, 19 and 20 can be included.

FIGS. 15, 16, 17 and 18 each show an embodiment where at least two of the antennas 3 each include a respective one of the amplifying repeaters 15. In each of these embodiments, one of the antennas 3 is for signal transmission and the other of the antennas 3 is for signal reception.

Figure 20:
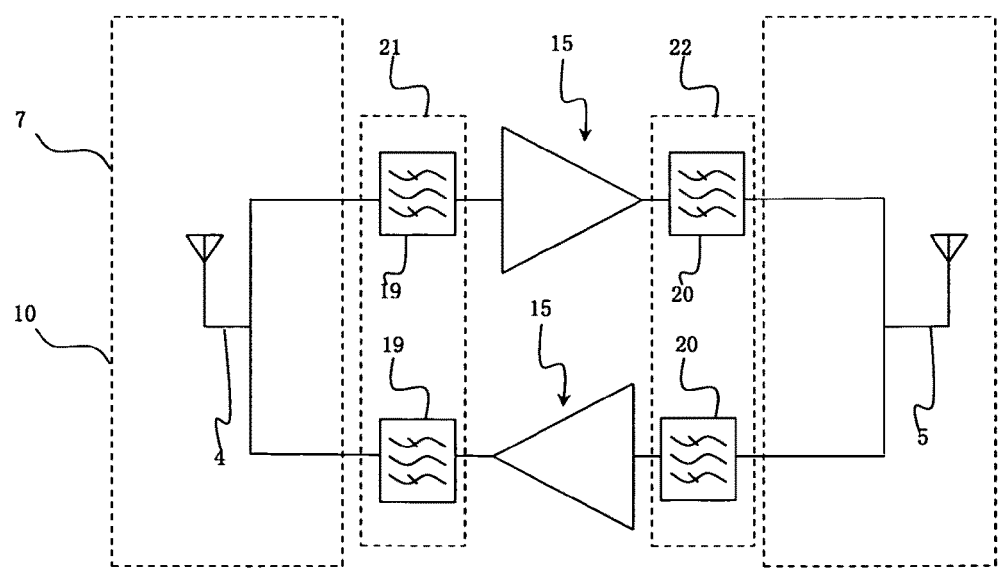
FIG. 20 is a schematic diagram of one antenna in accordance with another embodiment of the present invention, in which the antenna includes two amplifying repeaters and two duplexers.
Figure 21:
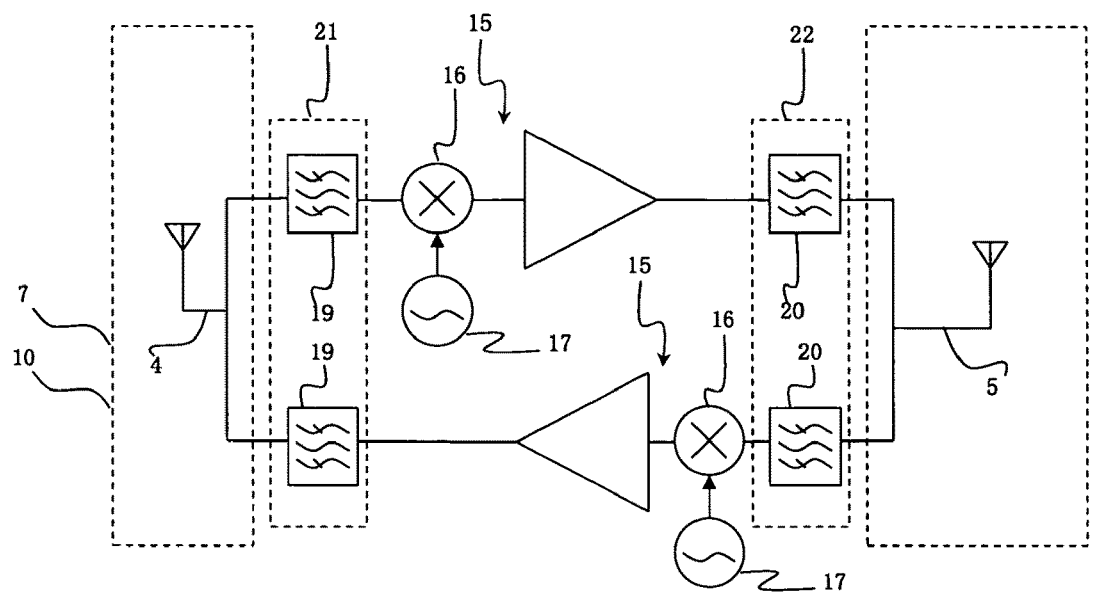
FIG. 21 is a schematic diagram of one antenna in accordance with a further embodiment of the present invention, in which the antenna includes two amplifying repeaters and two duplexers, each amplifying repeater having a mixer and a signal generator.

FIGS. 20 and 21 each show an embodiment where at least one of the antennas 3 includes two of the amplifying repeaters 15. In each of these embodiments, one of the amplifying repeaters 15 is for signal transmission and the other of the amplifying repeaters 15 is for signal reception. Each embodiment also includes a first duplexer 21 connecting the coupling portion 4 to the two amplifying repeaters 15, and a second duplexer 22 connecting the radiating portion 5 to the two amplifying repeaters 15. Thus, the one antenna 3 in each of these embodiments is for both signal transmission or reception. Preferably, the two respective filters 19 connected to the two amplifying repeaters 15 form the first duplexer 21, and the two respective filters 20 connected to the two amplifying repeaters 15 form the second duplexer 22. Thus, each duplexer is formed from two filters.

As shown in the embodiments depicted in the drawings, it is preferred that the coupling portion or portions 4 of the one or more antennas 3 form an array of spaced substantially parallel linear strips 23 across the coupling area 6. This thereby forms the repeater matrix across the coupling area 6, as mentioned above. In this way, at least one coupling portion 4 is coupled with a portable transceiver device 2 (or more specifically the inbuilt antenna of the portable transceiver device) when it is placed anywhere on the charging surface 9, and therefore inside the coupling area 6 which is adjacent the charging surface 9. Preferably, at least one of the antennas 3, if not all, is adapted for signal transmission or reception in at least a bandwidth of 800 MHz to 3 GHz. Furthermore, it is preferred that the antenna network 1 is in the form of a flexible or a rigid printed-circuit board, or a combination of both.

Figure 3:
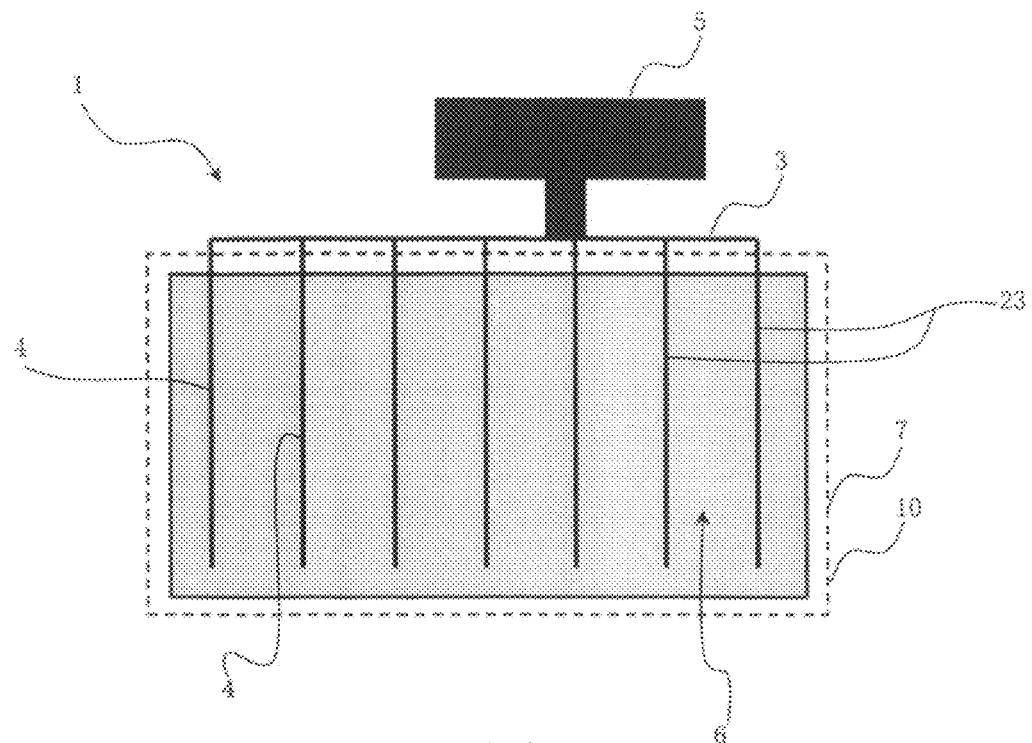
FIG. 3 is a schematic diagram of an antenna network in accordance with an embodiment of the present invention, in which the antenna network has one antenna.

Each particular embodiment of the antenna network 1 shown in the figures will now be described in further detail. The embodiment shown in FIG. 3 is a passive antenna network 1 having one antenna 3. The coupling portion 4 of the antenna 3 has branches forming the array of spaced substantially parallel linear strips 23 across the coupling area 6. Each branch is a thin coupling track. The coupling tracks can thereby be coupled with the antennas of portable electronic transceiver devices 2 regardless of the position of the portable electronic transceiver devices 2 on the charging surface 9. The coupling tracks are connected the radiating portion 5, which in this embodiment, is in the form of a main receiver/transmitter radiating patch.

Thus, in the present example, the coupling tracks are connected as one group and as such define the coupling portion 4. The main radiating patch 5 is located beyond the perimeter 10 of the signal shield 7, which is in the form of an electromagnetic (EM) shield. Thus, the main radiating patch 5 is outside the EM shielded area and the signal transmission and reception capacity of the main radiating patch in all directions is not limited by the EM shield 7. The shape of the antenna 3 is designed in such a way that it has broad-band coverage over at least the bandwidth of 800 MHz to 3 GHz.

In a variation to this embodiment, the one antenna 3 is an active antenna, such as the one described above that includes two of the amplifying repeaters 15 and the two duplexers 21 and 22, so that both signal transmission or signal reception can be actively enhanced.

In other embodiments, the antenna network 1 has a plurality of the antennas 3, where the coupling portion 4 of each antenna 3 forms at least one of the linear strips in the array of spaced substantially parallel linear strips 23.

Figure 4:
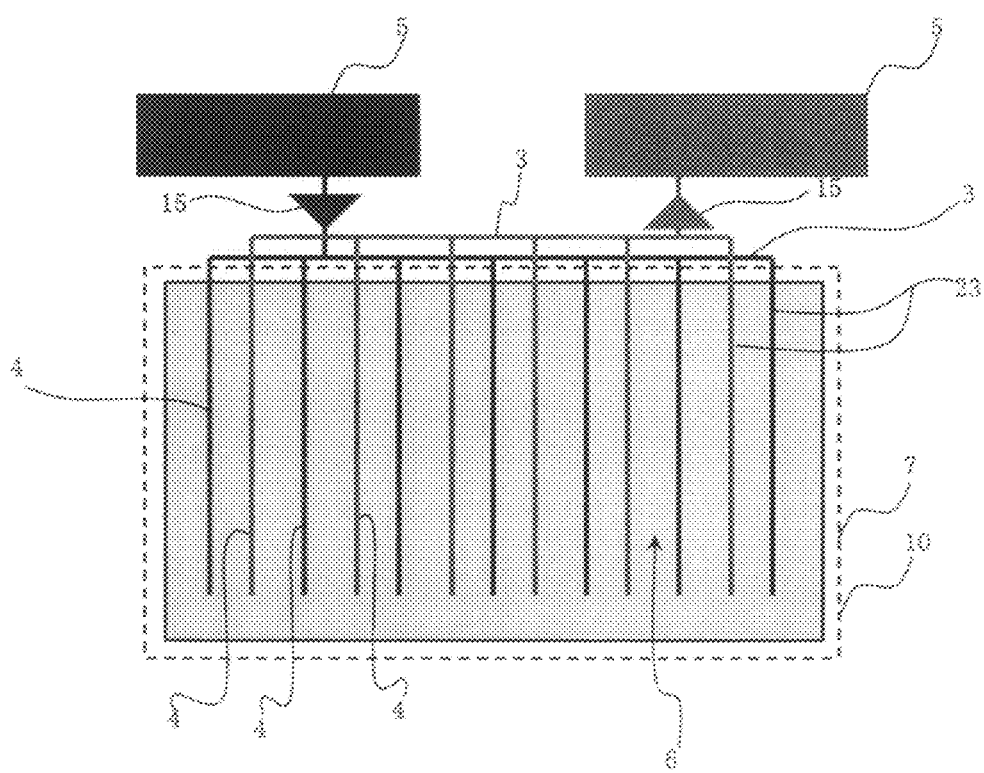
FIG. 4 is a schematic diagram of an antenna network in accordance with another embodiment of the present invention, in which the antenna network has two antennas.

For example, FIG. 4 shows a particular embodiment which has two antennas 3. The coupling portion 4 of each antenna 3 has branches forming a plurality of linear strips representing a complementary part of the array of spaced substantially parallel linear strips 23 across the coupling area 6. Each branch of each antenna 3 is a thin coupling track. However, both antennas 3 are active and each includes an amplifying repeater 15. One antenna is for signal transmission, and is therefore known as the transmitter (Tx) antenna, and the other antenna is for signal reception, and is therefore known as the receiver (Rx) antenna. Furthermore, the linear strips of the transmitter antenna alternate with the linear strips of the receiver antenna across the coupling area 6. The coupling tracks of each antenna are connected to a respective radiating portion 5. The radiating portion 5 of the transmitter antenna is in the form of a transmitter radiating patch, whilst the radiating portion 5 of the receiver antenna is in the form of a receiver radiating patch.

Thus, the coupling tracks are connected as two separate groups, each defining the coupling portion 4 of a respective antenna, with one group for signal transmission and the other group for signal reception. It will be appreciated that each antenna 3 is similar in general structure to the one antenna embodiment described earlier and depicted in FIG. 3. The transmitter radiating patch and the receiver radiating patch are both located beyond the perimeter 10 at one side of the signal shield 7. Thus, the radiating patches are outside the EM shielded area so they can transmit and receive signals with minimal obstruction by the EM shield 7.

Figure 5:
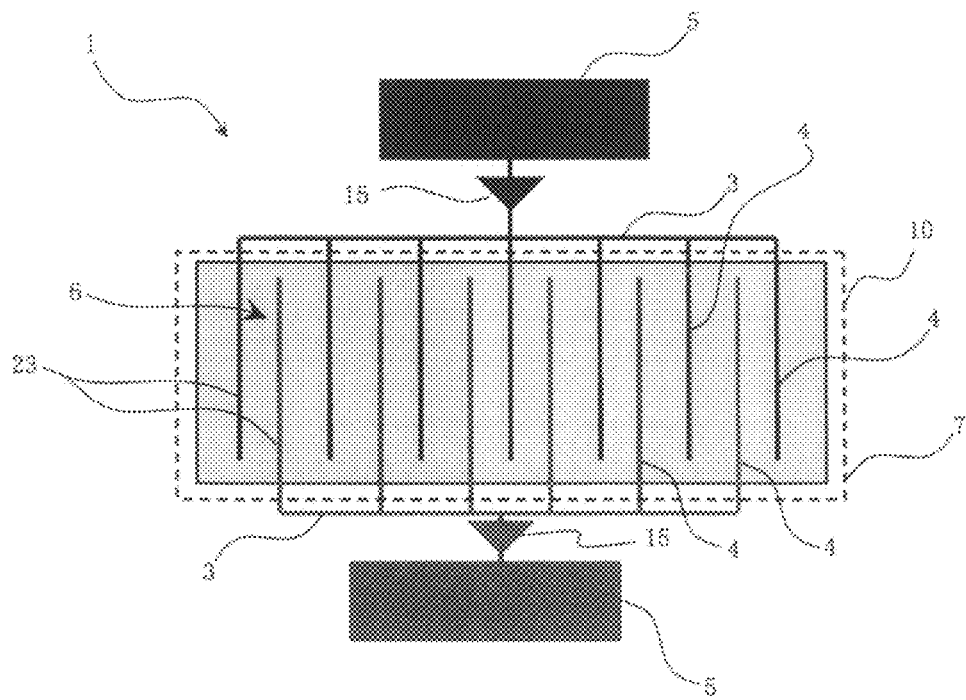
FIG. 5 is a schematic diagram of an antenna network in accordance with a further embodiment of the present invention, in which the antenna network has two antennas.

In order to avoid closed-loop feedback (cross talks) between the transmitter and receiver antennas, it is advisable to keep them apart. FIG. 5 shows a variation of the embodiment of FIG. 4, in which the transmitter and receiver radiating patches 5 are located at opposite sides of the signal shield 7.

Figure 6:
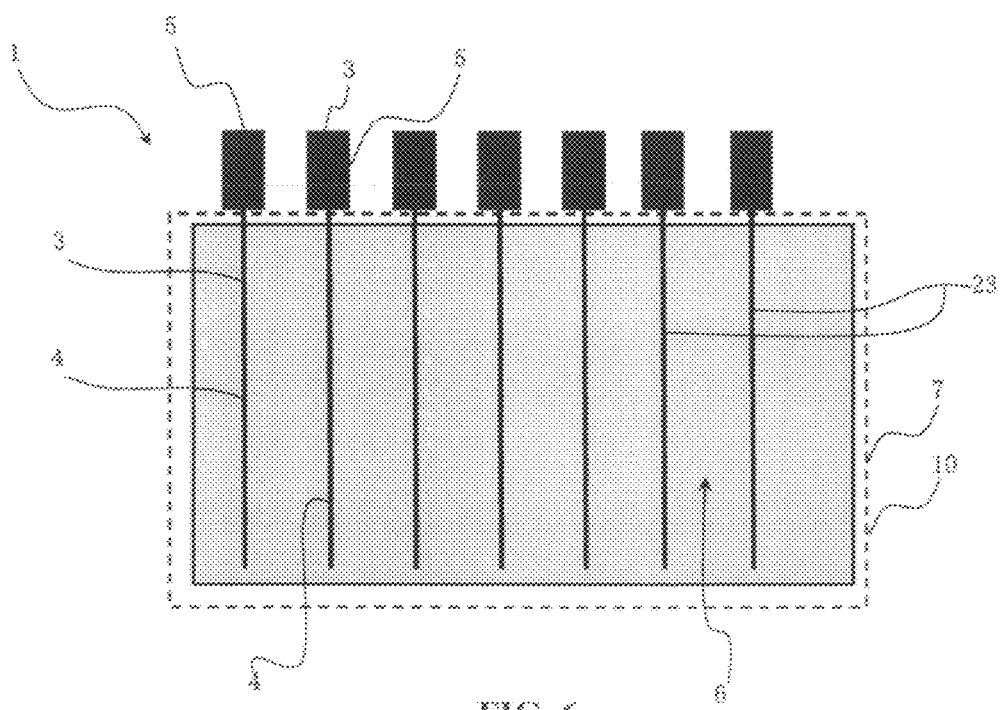
FIG. 6 is a schematic diagram of an antenna network in accordance with another embodiment of the present invention, in which the antenna network has a plurality of antennas.

In another example, FIG. 6 shows an embodiment which includes a plurality of individual antennas 3. Each antenna 3 has a coupling portion 4 in the form of a coupling track defining a respective one of the linear strips of the array 23. Each coupling track is connected to a respective radiator patch, which defines the radiating portion 5. The radiating portion 5 of each antenna 3 is located along one side of the coupling area 6 beyond the perimeter 10 of the signal shield 7. Some of the radiating portions 5 can be located on the first side 11 of the signal shield, that is, the same side on which the coupling area 6 is located, and other radiating portions 5 can be located on the second side 12 of the signal shield 7, which is opposite the first side 11.

Figure 7:
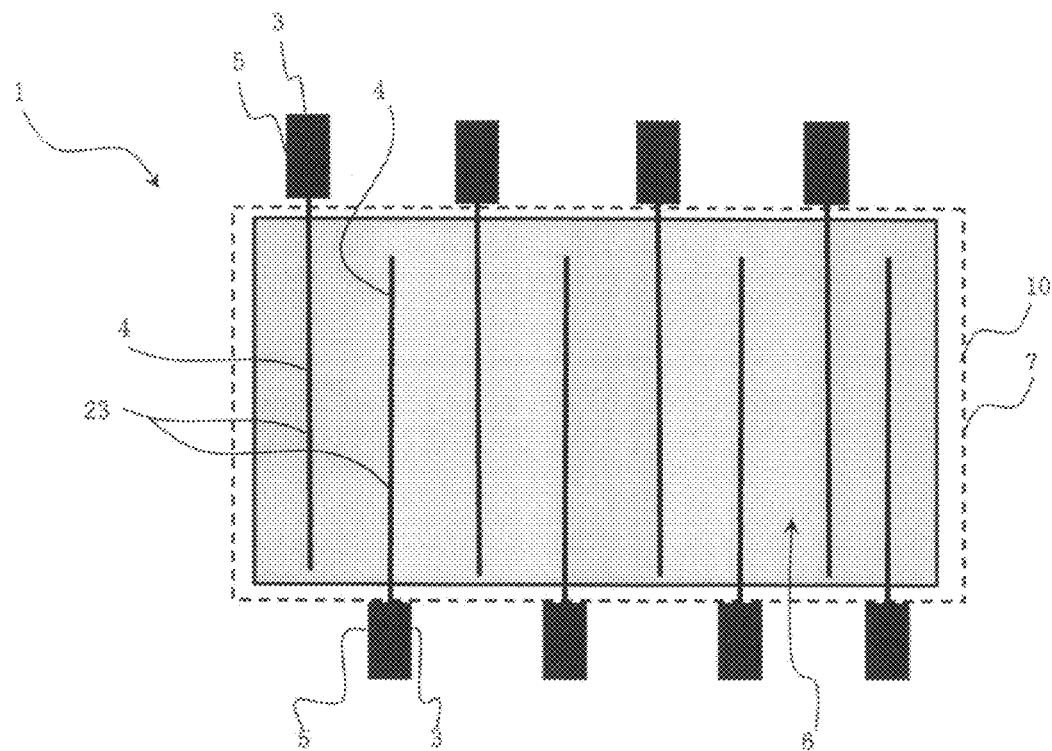
FIG. 7 is a schematic diagram of an antenna network in accordance with a further embodiment of the present invention, in which the antenna network has a plurality of antennas.

The embodiment of FIG. 7 is similar to that of FIG. 6, except that the radiating portions 5 of the antennas 3 are alternately located on two opposite sides of the coupling area 6 beyond the perimeter 10. This has the added advantage that by keeping the radiating portions 5 of the individual antennas 3 apart, the chance of interference or unwanted coupling between two or more antennas is further minimised. Again, the key feature of these embodiments is that the repeater matrix formed by the array of linear strips 23 allows portable electronic transceiver devices 2 to be placed anywhere within the area of the charging surface 9, and yet the antennas of the portable devices 2 are still coupled to at least one antenna 3 in the antenna network 1.

Figure 8:
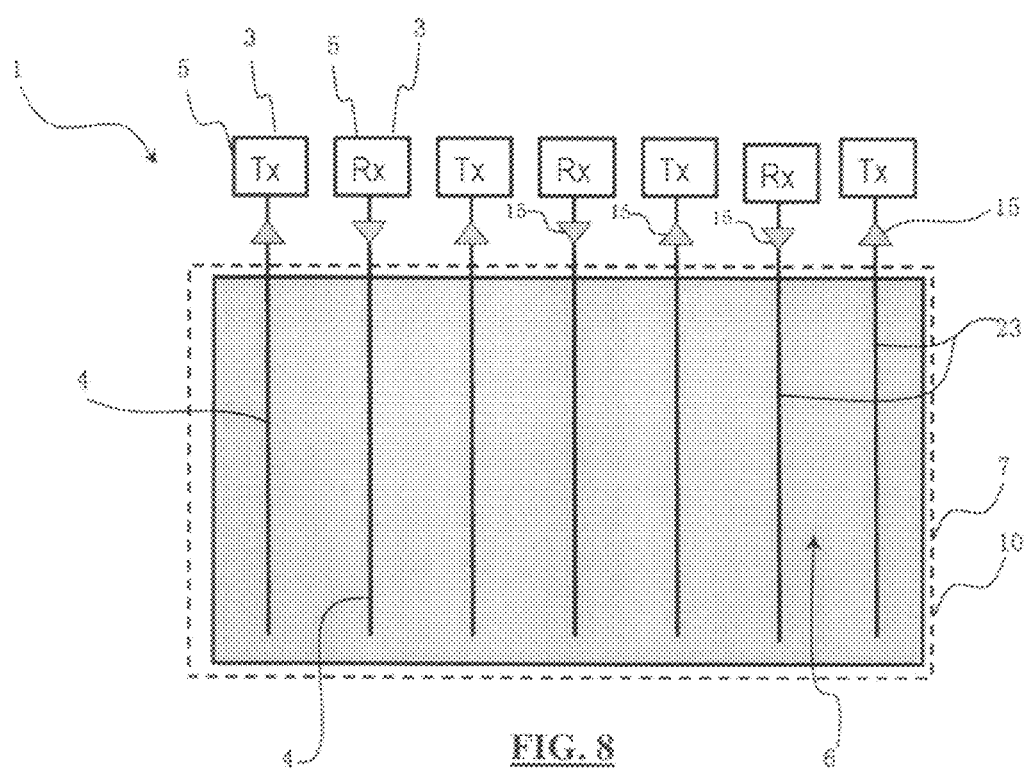
FIG. 8 is a schematic diagram of an antenna network in accordance with yet another embodiment of the present invention, in which the antenna network has a plurality of antennas.

A variation of the embodiment of FIG. 6 is shown in FIG. 8 in which the antennas 3 are all active antennas, such as those described above. In particular, each antenna includes one amplifying repeater 15 and is either a transmission antenna or a receiver antenna, that is, is either for signal transmission or signal reception respectively. The antennas are arranged so that the transmitter and receiver antennas alternate across the coupling area 6. As with the embodiment of FIG. 6, some of the radiating portions 5 of this variation can be located on the first side 11 of the signal shield, that is, the same side on which the coupling area 6 is located, and other radiating portions 5 can be located on the second side 12 of the signal shield 7, which is opposite the first side 11.

Figure 9:
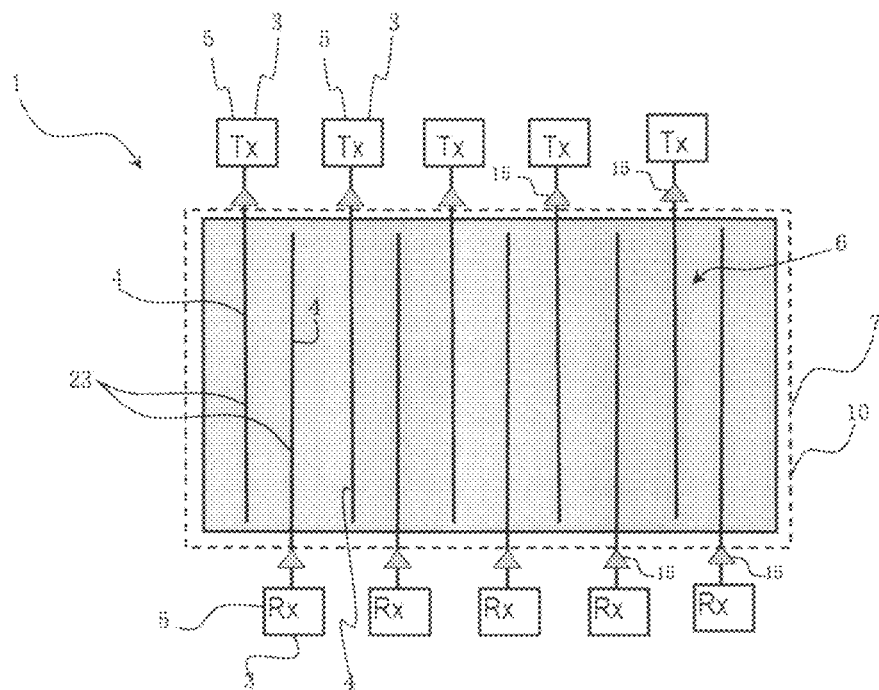
FIG. 9 is a schematic diagram of an antenna network in accordance with a further embodiment of the present invention, in which the antenna network has a plurality of antennas.

Similarly, a variation of the embodiment of FIG. 7 is shown in FIG. 9 in which the antennas 3 are all active antennas, such as those described above. In particular, each antenna includes one amplifying repeater 15 and is either a transmission antenna or a receiver antenna. The antennas are also arranged so that the transmitter and receiver antennas alternate across the coupling area 6. Like the embodiment in FIG. 7, the radiating portions 5 of the antennas 3 are alternately located on two opposite sides of the coupling area 6 beyond the perimeter 10. However, the transmitting radiating portions are located on one side of the coupling area 6, whilst the receiving radiating portions are located on the other side of the coupling area 6. Also, as with the other embodiments, some of the radiating portions 5 can be located on the first side 11 of the signal shield, that is, the same side on which the coupling area 6 is located, and other radiating portions 5 can be located on the second side 12 of the signal shield 7, which is opposite the first side 11.

In each of the embodiments respectively shown in FIGS. 10, 11, 12, 13 and 14, the array of linear strips 23 is aligned in a first direction. One or more of the coupling portions 4 of the one or more antennas 3 form another array of spaced substantially parallel linear strips 24 aligned in a second direction across the coupling area 6. A matrix of linear strips 23, 24 is thereby formed across the coupling area 6. This further enhances signal transmission or reception in all directions. The first and second directions are preferably substantially orthogonal to each other, thereby forming a grid of linear strips 23, 24 across the coupling area 6.

Also, the arrays of linear strips 23 and 24 are preferably electrically isolated to minimise the formation of current loops. Thus, two layers of coupling portions 4 are provided. These two layers of coupling portions 4, which are in the form of coupling tracks, can be formed, for example, on two sides of a printed-circuit board that can be of standard or flexible type. The coupling tracks extend beyond the area of the EM signal shield 7 so that signal transmission and reception in all directions from the EM shield 7 can be achieved.

Figure 12:
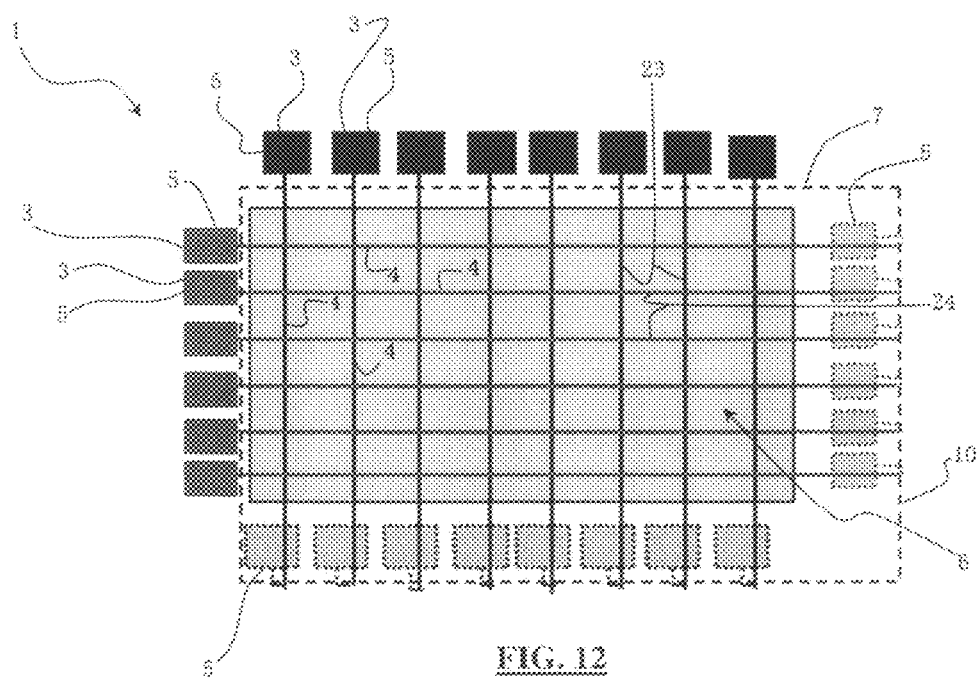
FIG. 12 is a schematic diagram of an antenna network in accordance with another embodiment of the present invention, in which the antenna network has a plurality of antennas and the coupling portions form a grid.

The embodiment shown in FIG. 12 is similar to the embodiments of FIGS. 6 and 7. In particular, each array of linear strips 23 and 24 is formed by an instance of the embodiment depicted in FIG. 6 or 7, and as described above. The first and second directions, in which the arrays of linear strips 23 and 24 are respectively aligned, are substantially orthogonal to the other.

In other words, the array of linear strips 23 is formed by a first plurality of individual antennas 3, similar to the plurality described for the embodiment of FIG. 6 or 7. The coupling portions 4 of the first plurality of the individual antennas 3 are in the form of coupling tracks aligned in the first direction, thereby defining the array of linear strips 23 aligned in the first direction. The array of linear strips 24 is formed by a second plurality of individual antennas 3, again similar to the plurality described for the embodiment of FIG. 6 or 7. The coupling portions 4 of the second plurality of the individual antennas 3 are in the form of coupling tracks aligned in the second direction, thereby defining the array of linear strips 23 aligned in the second direction.

There is, however, one difference between the antennas of the embodiments of FIGS. 6 and 12. Each antenna of the embodiment shown in FIG. 12 includes a radiating portion 5 in the form of two radiating patches, one on one end of the coupling track 4 and the other on the other end of the coupling track 4. Furthermore, the radiating patches on one side of the coupling area 6 are on the first side 11 of the signal shield 7, whilst the radiating patches on an opposite side of the coupling area 6 are on the second side 12 of the signal shield 7.

Figure 13:
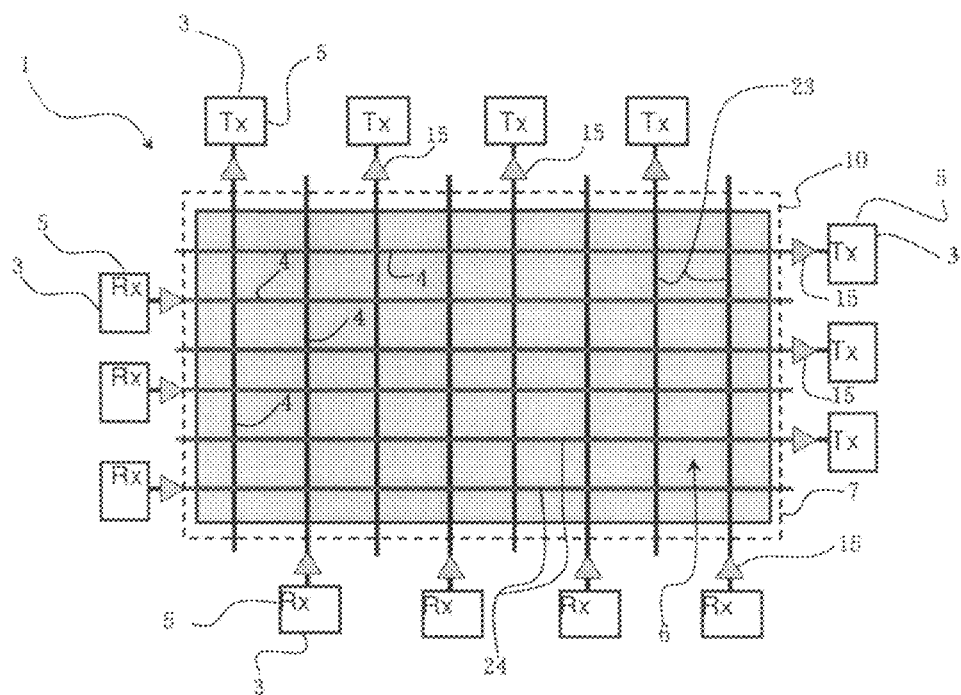
FIG. 13 is a schematic diagram of an antenna network in accordance with a further embodiment of the present invention, in which the antenna network has a plurality of antennas and the coupling portions form a grid.

The embodiment of FIG. 13 is similar to the embodiment of FIG. 9. In particular, each array of linear strips 23 and 24 is formed by an instance of the embodiment depicted in FIG. 9. The first and second directions, in which the arrays of linear strips 23 and 24 are respectively aligned, are substantially orthogonal to the other.

In other words, the array of linear strips 23 is formed by a first plurality of individual antennas 3, similar to the plurality described for the embodiment of FIG. 9. The coupling portions 4 of the first plurality of the individual antennas 3 are in the form of coupling tracks aligned in the first direction, thereby defining the array of linear strips 23 aligned in the first direction. The array of linear strips 24 is formed by a second plurality of individual antennas 3, similar to the plurality described for the embodiment of FIG. 9. The coupling portions 4 of the second plurality of the individual antennas 3 are in the form of coupling tracks aligned in the second direction, thereby defining the array of linear strips 23 aligned in the second direction.

Also, the transmitting radiating portions 5 of the first plurality of individual antennas 3 are located on a first side of the coupling area 6, whilst the receiving radiating portions 5 of the first plurality of individual antennas 3 are located on a second side of the coupling area 6 opposite the first side. The transmitting radiating portions 5 of the second plurality of individual antennas 3 are located on a third side of the coupling area 6, whilst the receiving radiating portions 5 of the second plurality of individual antennas 3 are located on a fourth side of the coupling area 6 opposite the third side. Thus, the radiating portions 5 surround the perimeter 10 and the coupling area 6 on four sides.

Figure 14:
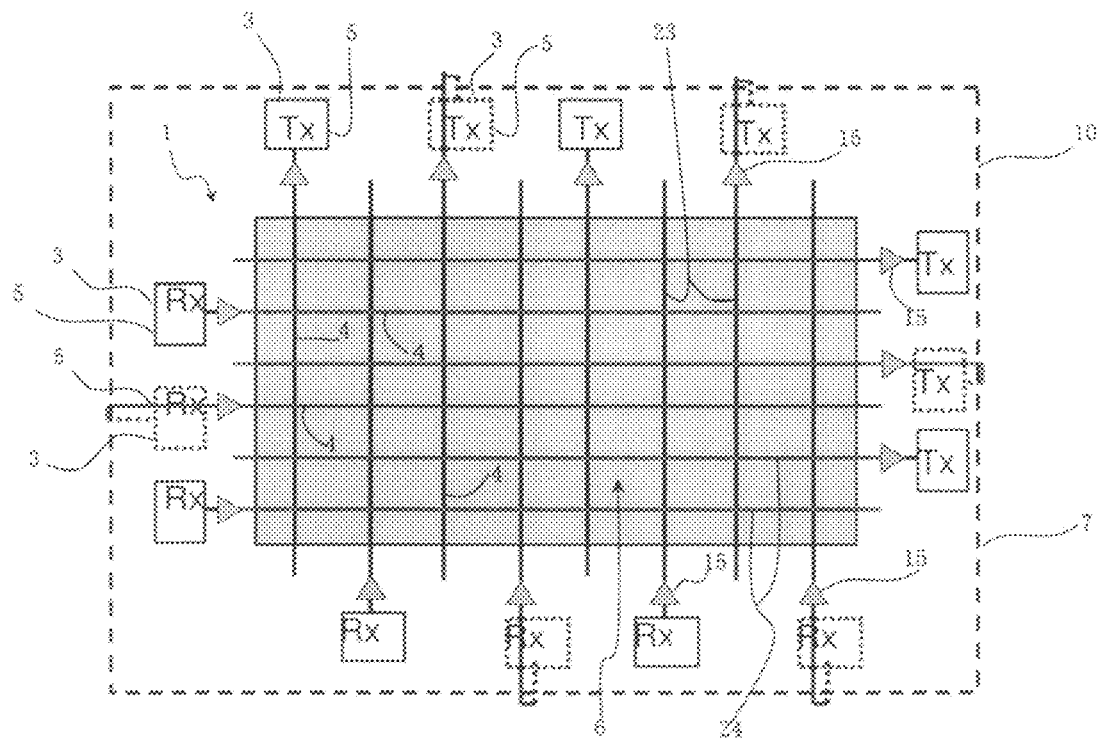
FIG. 14 is a schematic diagram of an antenna network in accordance with yet another embodiment of the present invention, in which the antenna network has a plurality of antennas and the coupling portions form a grid.
Figure 15:
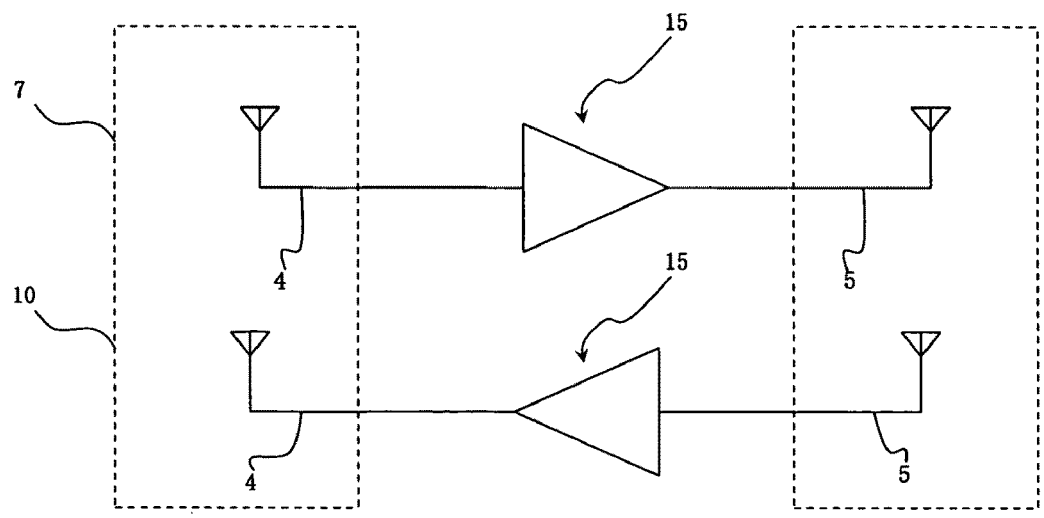
FIG. 15 is a schematic diagram of two antennas in accordance with an embodiment of the present invention, in which each antenna includes an amplifying repeater.
Figure 16:
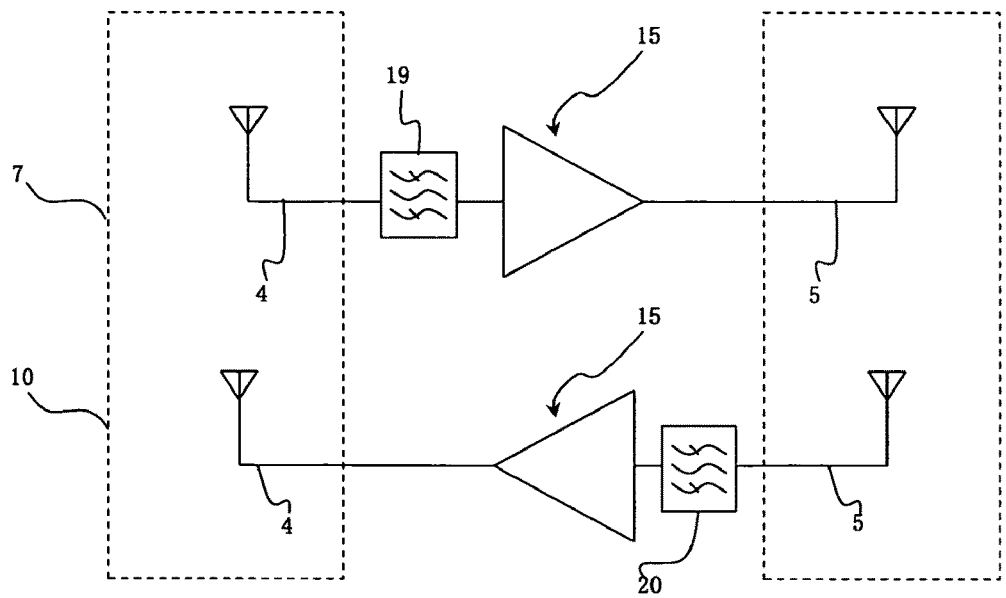
FIG. 16 is a schematic diagram of two antennas in accordance with another embodiment of the present invention, in which each antenna includes an amplifying repeater and a filter.
Figure 17:
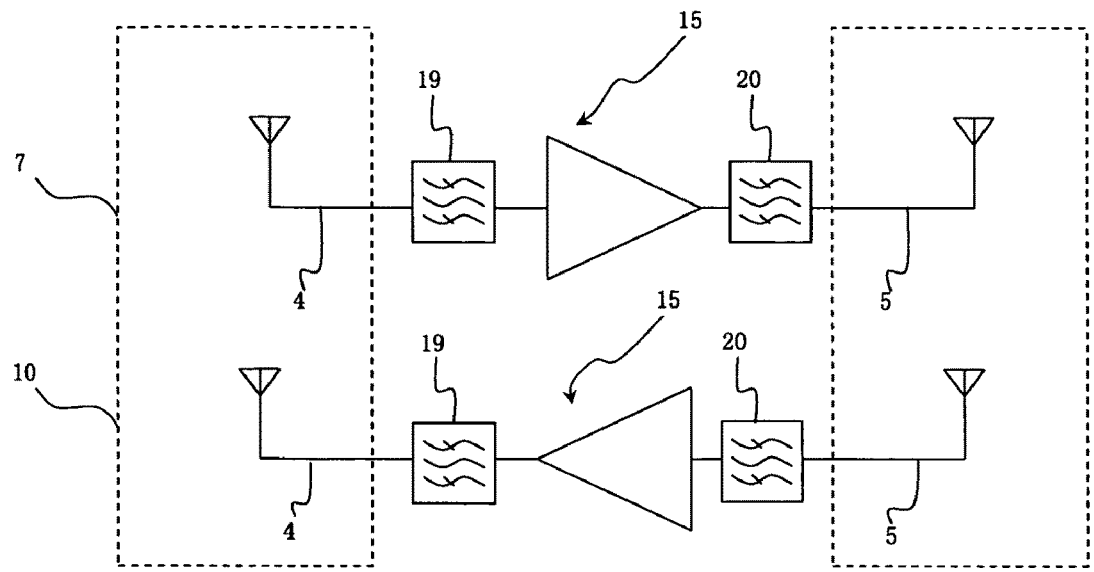
FIG. 17 is a schematic diagram of two antennas in accordance with a further embodiment of the present invention, in which each antenna includes an amplifying repeater and two filters.

The embodiment of FIG. 14 is a slight variation of the embodiment of FIG. 13 where the radiating portions 5, in both the first and second directions across the coupling area 6, alternate from being located on the first side 11 of the signal shield 7 and the second side 12 of the signal shield 7.

In other versions of these embodiments, the antenna network 1 can be integrated into the multiple layer structure of the primary (transmitter) winding system of the wireless power transfer device 8. In addition, the antenna network 1 of this embodiment can be utilised as a separate accessory 15 as shown schematically in FIG. 11.

It will be appreciated that in embodiments where the charging surface is on top of the wireless power transfer device 8 and the EM signal shield 7 forms the bottom of the wireless power transfer device 8, some or all of the antennas 3 of the antenna network 1 can be extended to and located on the bottom of the wireless power transfer device 8. In this way, signal transmission and reception in directions away from the bottom of the wireless power transfer device 8 is enhanced. The wireless power transfer devices 8 of these embodiments are typically those that are placed on horizontal surfaces such as table tops.

Two such embodiments are shown in FIGS. 12 and 14. In each embodiment, the radiating portions 5 of the antennas 3 of the antenna network 1 are placed on both the top surface and bottom surface of the wireless power transfer device 8. The radiating portions on the top surface are shown in solid lines, whilst the radiating portions 5 on the bottom surface are shown in broken lines. The coupling portions 4 are adjacent the charging surface 9, and accordingly, the coupling area 6 is on the top side. It will be appreciated that, in this example, and utilising the terminology introduced above, the top side is the first side 11 of the signal shield 7, and the bottom side is the second side 12 of the signal shield 7, which is opposite the first side 11. Thus, signals can be transmitted or received in the bottom direction of the wireless power transfer device 8. Accordingly, the problem of signal reduction imposed by the EM shield 7 underneath the charging surface 9 can be overcome or ameliorated.

As described above, the present invention discloses techniques of enhancing signal transmission and reception in portable electronic transceiver devices, such as mobile phones and other equipment with signal transmission and reception functionality. It will be appreciated that these techniques are well-suited to applications where these portable transceiver devices are to be charged wirelessly in any position and orientation on the charging surface of a wireless power transfer device, such as a wireless battery charging system. That is to say, the present invention allows the free-positioning of portable transceiver devices on charging surfaces. This is especially so in cases where the wireless power transfer device includes an electromagnetic signal shield.

Although the invention has been described with reference to specific examples, it will be appreciated by those skilled in the art that the invention can be embodied in many other forms. It will also be appreciated by those skilled in the art that the features of the various examples described can be combined in other combinations.

The invention claimed is:

1. An antenna network for enhancing signal transmission or reception of one or more portable transceiver devices comprising:
   one or more antennas, each antenna comprising:
      a coupling portion disposed across a coupling area between a signal shield of a wireless charging device and a wireless charging surface, the coupling portion facilitating communication signal reception and transmission to and from a portable transceiver device; and
      at least one radiating portion connected to the coupling portion, the radiating portion being located outside an area defined by a perimeter of the signal shield, whereby signal transmission or reception of the one or more portable transceiver devices occurs through the radiating portion when the one or more portable transceiver devices are located within the coupling area.

2. An antenna network according to claim 1 wherein the coupling area is adjacent the signal shield.

3. An antenna network according to claim 1 wherein the radiating portion of at least one of the antennas is located such that signal transmission or reception of the one or more portable transceiver devices through the radiating portion can substantially circumvent the signal shield.

4. An antenna network according to claim 2 wherein the coupling area is on a first side of the signal shield and the radiating portion of at least one of the antennas is located on a second side of the signal shield opposite the first side.

5. An antenna network according to claim 1 wherein the one or more antennas form a repeater matrix across the coupling area.

6. An antenna network according to claim 1 wherein at least one of the antennas is thin.

7. An antenna network according to claim 1 wherein at least one of the antennas is planar.

8. An antenna network according to claim 1 wherein at least one of the antennas is made of metal.

9. An antenna network according to claim 1 wherein the coupling portion and the radiating portion of at least one of the antennas are combined in the form of an elongate strip.

10. An antenna network according to claim 1 wherein the coupling portion of at least one of the antennas is a coupling track.

11. An antenna network according to claim 1 wherein the radiating portion of at least one of the antennas is a radiating patch.

12. An antenna network according to claim 1 having a plurality of the antennas spaced apart such that interference between the antennas is minimised.

13. An antenna network according to claim 1 wherein the coupling portion or portions of the one or more antennas form an array of spaced substantially parallel linear strips across the coupling area.

14. An antenna network according to claim 13 having one of the antennas, wherein the coupling portion has branches forming the array of spaced substantially parallel linear strips across the coupling area.

15. An antenna network according to claim 13 having a plurality of the antennas, wherein the coupling portion of each antenna forms at least one of the linear strips in the array of spaced substantially parallel linear strips.

16. An antenna network according to claim 15 wherein the radiating portion of each antenna is located along one side of the coupling area.

17. An antenna network according to claim 15 wherein the radiating portions of the antennas are alternately located on two opposite sides of the coupling area.

18. An antenna network according to claim 13 wherein the array of linear strips is aligned in a first direction, and one or more of the coupling portions of the one or more antennas form another array of spaced substantially parallel linear strips aligned in a second direction across the coupling area, thereby forming a matrix of linear strips across the coupling area.

19. An antenna network according to claim 18 wherein the arrays of linear strips are electrically isolated to minimise the formation of current loops.

20. An antenna network according to claim 18 wherein the first and second directions are substantially orthogonal to each other, thereby forming a grid of linear strips across the coupling area.

21. An antenna network according to claim 1 wherein at least one of the antennas includes an amplifying repeater connected between the coupling portion and the radiating portion for amplifying signal transmission or reception.

22. An antenna network according to claim 21 wherein the amplifying repeater includes a power amplifier or a low noise amplifier.

23. An antenna network according to claim 21 wherein the amplifying repeater includes a mixer and a signal generator to change the frequency channel of signal transmission or reception, thereby to minimise any feedback.

24. An antenna network according to claim 23 wherein the mixer includes a filter.

25. An antenna network according to claim 23 wherein the signal generator includes a filter.

26. An antenna network according to claim 21 wherein the antenna includes a filter connected between the coupling portion and the amplifying repeater.

27. An antenna network according to claim 21 wherein the antenna includes a filter connected between the radiating portion and the amplifying repeater.

28. An antenna network according to claim 21 wherein at least two of the antennas each include a respective amplifying repeater, one of the antennas being for signal transmission and the other of the antennas being for signal reception.

29. An antenna network according to claim 21 wherein the at least one of the antennas includes:
   two of the amplifying repeaters, one of the amplifying repeaters being for signal transmission and the other of the amplifying repeaters being for signal reception;

a first duplexer connecting the coupling portion to the two amplifying repeaters; and a second duplexer connecting the radiating portion to the two amplifying repeaters;

the antenna thereby being for both signal transmission or reception.

30. An antenna network according to claim 29 wherein each duplexer is formed from two filters.

31. An antenna network according to claim 21 including a power supply for powering the amplifying repeater.

32. An antenna network according to claim 31 wherein the power supply includes one or both of a battery and a solar panel.

33. An antenna network according to claim 2 wherein the signal shield is part of a wireless power transfer device having a charging surface, the charging surface being in the coupling area.

34. An antenna network according to claim 33 wherein the one or more coupling portions are embedded in the charging surface.

35. An antenna network according to claim 33 wherein the wireless power transfer device includes a power transfer winding structure, and the one or more coupling portions are integrated into the power transfer winding structure.

36. An antenna network according to claim 33 wherein the one or more coupling portions are provided in an accessory device adapted for use with the wireless power transfer device such that the coupling portions can be placed adjacent the charging surface.

37. An antenna network according to claim 1 wherein at least one of the antennas is adapted for signal transmission or reception in at least a bandwidth of 800 MHz to 3 GHz.

38. An antenna network according to claim 1 wherein the antenna network is in the form of a flexible or a rigid printed-circuit board, or a combination of both.

39. A wireless charging device comprising:

a signal shield having a perimeter;

a wireless charging surface used to wirelessly charge a portable transceiver device and disposed proximate to the signal shield;

an antenna network including one or more antennas, each having at least one antenna comprising:

a coupling portion disposed across a coupling area between the signal shield and the wireless charging surface, the coupling portion facilitating communication signal reception and transmission to and from the portable transceiver device; and at least one radiating portion connected to the coupling portion, the radiating portion being located outside an area defined by the perimeter of the signal shield, whereby signal transmission or reception of the one or more portable transceiver devices occurs through the radiating portion when the one or more portable transceiver devices are located within the coupling area.

* * * * *

UNITED STATES PATENT AND TRADEMARK OFFICE
CERTIFICATE OF CORRECTION

PATENT NO. : 8,301,077 B2
APPLICATION NO. : 12/566438
DATED : October 23, 2012
INVENTOR(S) : Quan Xue, Shu Yuen Ron Hui and Kwun Chiu Wan It is certified that error appears in the above-identified patent and that said Letters Patent is hereby corrected as shown below:

Title page 1, column 2, item (57), Abstract replace "The Present Invention Provides an Antenna Network for Passively or Actively enhancing signal transmission or reception of one or more portable transceiver devices." with --The present invention provides an antenna network for passively or actively enhancing signal transmission or reception of one or more portable transceiver devices.--.

Signed and Sealed this
Third Day of September, 2013

Teresa Stanek Rea
*Acting Director of the United States Patent and Trademark Office*